US011568290B2

(12) United States Patent
Watanabe et al.

(10) Patent No.: US 11,568,290 B2
(45) Date of Patent: Jan. 31, 2023

(54) METHOD FOR DISPLAYING, USER INTERFACE UNIT, DISPLAY DEVICE AND INSPECTION APPARATUS

(71) Applicant: FANUC CORPORATION, Yamanashi (JP)

(72) Inventors: Mitsunori Watanabe, Yamanashi (JP); Keisuke Watanabe, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 365 days.

(21) Appl. No.: 16/831,808

(22) Filed: Mar. 27, 2020

(65) Prior Publication Data
US 2020/0311588 A1 Oct. 1, 2020

(30) Foreign Application Priority Data

Mar. 29, 2019 (JP) .............................. JP2019-065700

(51) Int. Cl.
*G06N 7/00* (2006.01)
*G06N 20/00* (2019.01)
*G06F 16/901* (2019.01)

(52) U.S. Cl.
CPC ......... *G06N 7/005* (2013.01); *G06F 16/9024* (2019.01); *G06N 20/00* (2019.01)

(58) Field of Classification Search
CPC ........ G06N 7/005; G06N 20/00; G06N 20/20; G06N 3/0454; G06N 3/08; G06N 5/003;
(Continued)

(56) References Cited

U.S. PATENT DOCUMENTS 6,345,265 B1 * 2/2002 Thiesson .............. G06K 9/6296
706/45
9,836,183 B1 * 12/2017 Love ..................... G06F 16/904
(Continued)

FOREIGN PATENT DOCUMENTS

JP 2001156135 A 6/2001
JP 2008-59080 A 3/2008
(Continued)

OTHER PUBLICATIONS

Atsushi Nakamura et al., "Machine Learning with Training Condition Zone Classification for Neural Network Model of FastADR Control of Building Air-conditioners", The Papers of Technical Meeting on "Systems", IEE Japan, Dec. 2, 2016, p. 29-p. 34, ST-16-042-053, the Institute of Electrical Engineers of Japan, 9pp.

*Primary Examiner* — Michael Won
(74) *Attorney, Agent, or Firm* — Hauptman Ham, LLP

(57) ABSTRACT

An inspection apparatus includes a group data creation unit configured to create group data obtained by dividing a plurality of samples into a plurality of groups, a statistical state calculation unit configured to perform a statistical process for the samples divided into each of the groups to calculate data indicating a statistical state of a predetermined data item between the groups, and a user interface unit configured to display the statistical state in a display format enabling recognition of the statistical state between the groups on the basis of the data indicating the statistical state of the predetermined data item between the groups calculated by the statistical state calculation unit.

18 Claims, 15 Drawing Sheets

(58) Field of Classification Search
CPC ............ G06F 16/9024; G06F 16/2462; G06F 16/248; G06Q 10/06395; G06Q 50/04; G06T 7/0004; G06T 2207/20081
See application file for complete search history.

(56) References Cited

U.S. PATENT DOCUMENTS

| | | | |
|---|---|---|---|
| 10,614,369 B2* | 4/2020 | Murakami | G06K 9/6279 |
| 10,789,755 B2* | 9/2020 | Amer | G06V 40/20 |
| 10,824,607 B2* | 11/2020 | Xia | G06F 16/2282 |
| 2006/0274933 A1 | 12/2006 | Obara et al. | |
| 2016/0210535 A1 | 7/2016 | Takimoto | |
| 2016/0267397 A1* | 9/2016 | Carlsson | G06N 5/025 |

FOREIGN PATENT DOCUMENTS

| | | |
|---|---|---|
| JP | 2013-218725 A | 10/2013 |
| JP | 2014142871 A | 8/2014 |
| JP | 2014167450 A | 9/2014 |
| JP | 2016133895 A | 7/2016 |

* cited by examiner

FIG. 3

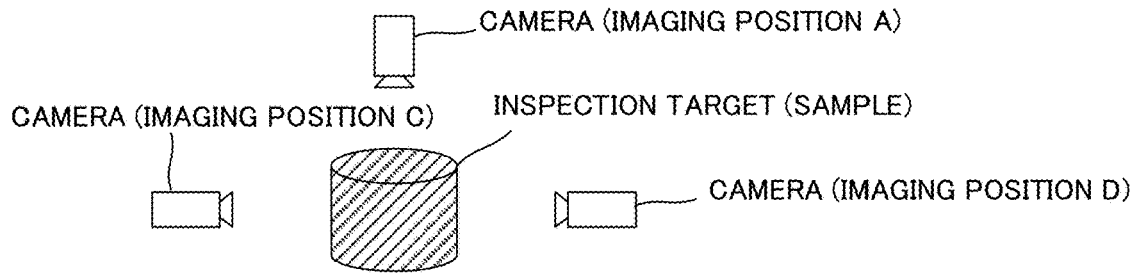

GROUP A

SAMPLE A-1

| IMAGE DATA IMAGE IDENTIFICATION NUMBER: 1 | IMAGE DATA IMAGE IDENTIFICATION NUMBER: 2 | IMAGE DATA IMAGE IDENTIFICATION NUMBER: 3 | IMAGE DATA IMAGE IDENTIFICATION NUMBER: 4 | |
|---|---|---|---|---|
| 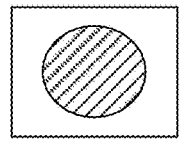 | 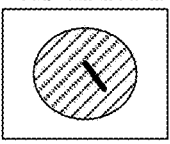 | 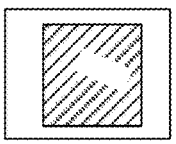 | 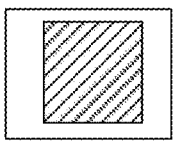 | ... |
| PRESENCE OR ABSENCE OF FLAW: ABSENCE FLAW TYPE: – | PRESENCE OR ABSENCE OF FLAW: PRESENCE FLAW TYPE: CUT | PRESENCE OR ABSENCE OF FLAW: PRESENCE FLAW TYPE: SCRATCH | PRESENCE OR ABSENCE OF FLAW: ABSENCE FLAW TYPE: – | |

GROUP B

SAMPLE B-1

| IMAGE DATA IMAGE IDENTIFICATION NUMBER: 1 | IMAGE DATA IMAGE IDENTIFICATION NUMBER: 2 | IMAGE DATA IMAGE IDENTIFICATION NUMBER: 3 | IMAGE DATA IMAGE IDENTIFICATION NUMBER: 4 | |
|---|---|---|---|---|
| 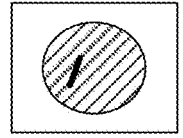 | 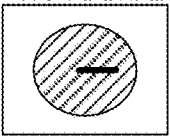 | 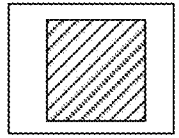 | 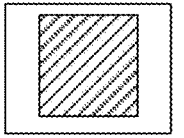 | ... |
| PRESENCE OR ABSENCE OF FLAW: PRESENCE FLAW TYPE: CUT | PRESENCE OR ABSENCE OF FLAW: PRESENCE FLAW TYPE: CUT | PRESENCE OR ABSENCE OF FLAW: ABSENCE FLAW TYPE: – | PRESENCE OR ABSENCE OF FLAW: ABSENCE FLAW TYPE: – | |

FIG. 4
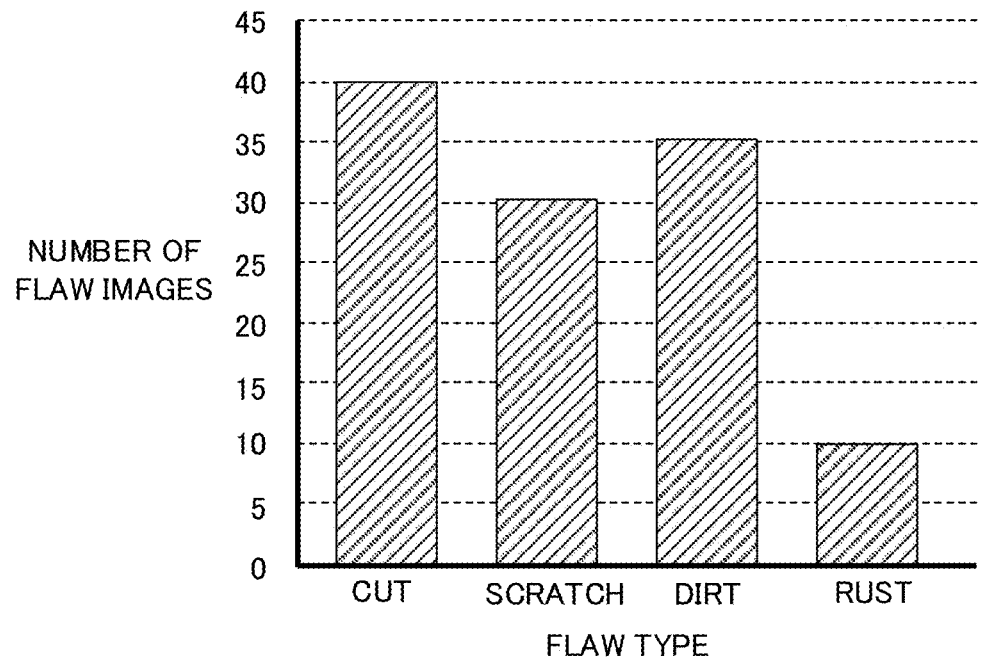
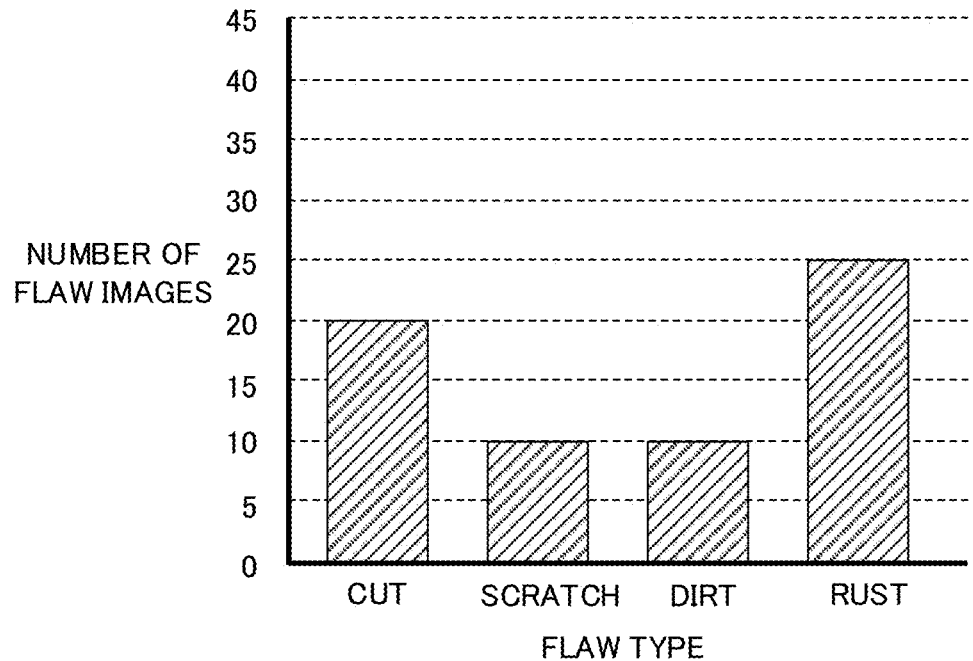

FIG. 5
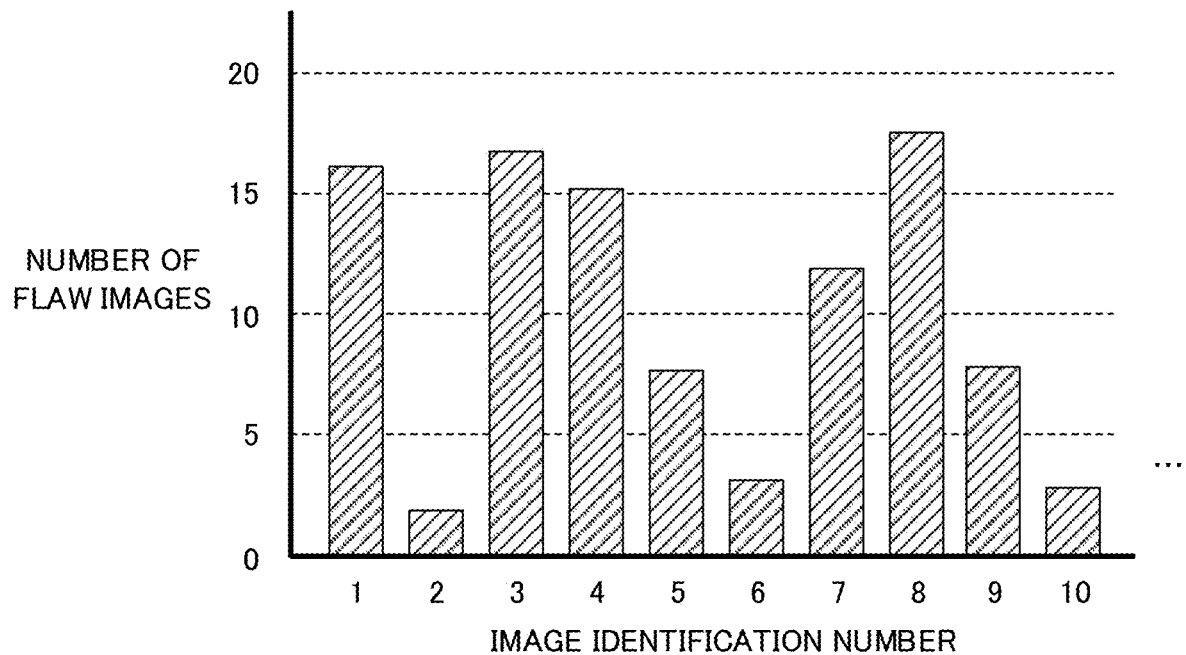
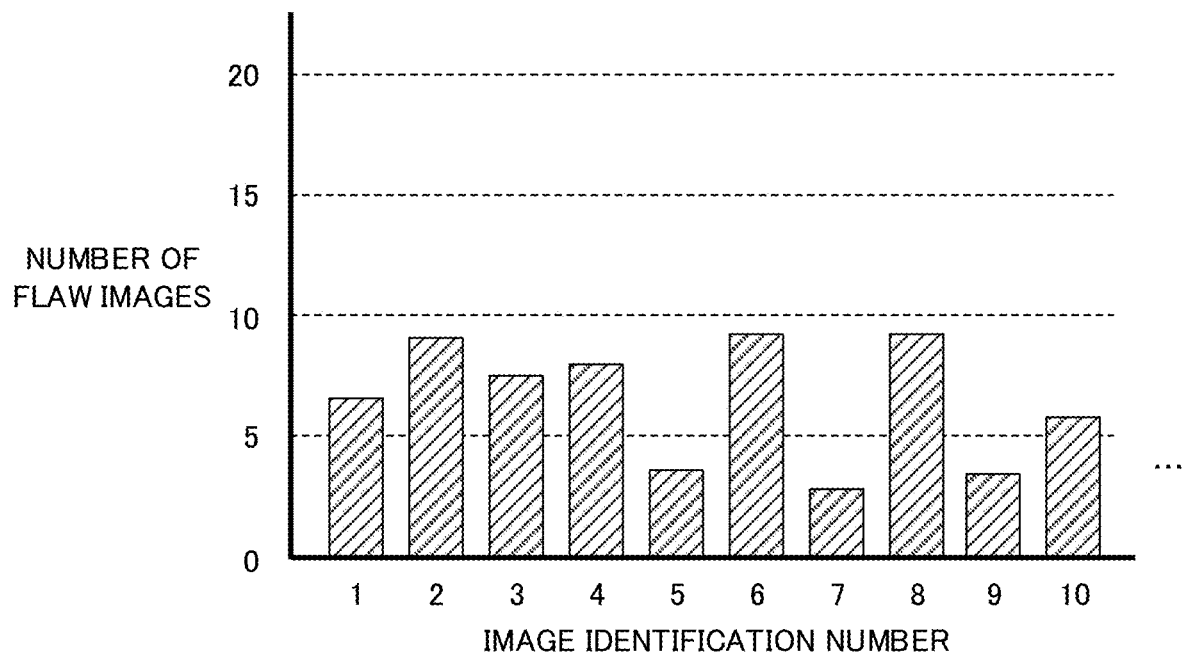

FIG. 6

[GROUP A]

| SAMPLE NAME | NUMBER OF FLAW IMAGES | FLAW TYPE |
|---|---|---|
| SAMPLE A-1 | 2 | CUT AND SCRATCH |
| SAMPLE A-2 | 0 | |
| SAMPLE A-3 | 0 | |
| SAMPLE A-4 | 0 | |
| SAMPLE A-5 | 0 | |
| SAMPLE A-6 | 0 | |
| SAMPLE A-7 | 0 | |
| SAMPLE A-8 | 0 | |
| SAMPLE A-9 | 1 | SCRATCH |
| SAMPLE A-10 | 0 | |
| SAMPLE A-11 | 0 | |
| SAMPLE A-12 | 3 | CUT AND SCRATCH |
| SAMPLE A-13 | 0 | |
| SAMPLE A-14 | 0 | |
| SAMPLE A-15 | 2 | DIRT |
| SAMPLE A-16 | 0 | |
| SAMPLE A-17 | 1 | RUST |
| SAMPLE A-18 | 3 | CUT |
| SAMPLE A-19 | 3 | SCRATCH |
| SAMPLE A-20 | 0 | |
| ... | ... | ... |

[GROUP B]

| SAMPLE NAME | NUMBER OF FLAW IMAGES | FLAW TYPE |
|---|---|---|
| SAMPLE B-1 | 2 | CUT |
| SAMPLE B-2 | 0 | |
| SAMPLE B-3 | 3 | SCRATCH AND DIRT |
| SAMPLE B-4 | 2 | DIRT |
| SAMPLE B-5 | 0 | |
| SAMPLE B-6 | 0 | |
| SAMPLE B-7 | 0 | |
| SAMPLE B-8 | 0 | |
| SAMPLE B-9 | 0 | |
| SAMPLE B-10 | 0 | |
| SAMPLE B-11 | 2 | CUT |
| SAMPLE B-12 | 0 | |
| SAMPLE B-13 | 0 | |
| SAMPLE B-14 | 0 | |
| SAMPLE B-15 | 0 | |
| SAMPLE B-16 | 1 | RUST |
| SAMPLE B-17 | 2 | CUT |
| SAMPLE B-18 | 2 | RUST |
| SAMPLE B-19 | 0 | |
| SAMPLE B-20 | 0 | |
| ... | ... | ... |

FIG. 9

[GROUP A]

| SAMPLE NAME | NUMBER OF FLAW IMAGES | FLAW TYPE |
|---|---|---|
| SAMPLE A-1 | 2 | CUT AND SCRATCH |
| SAMPLE A-2 | 0 | DIRT |
| SAMPLE A-3 | 0 | |
| SAMPLE A-4 | 0 | |
| SAMPLE A-5 | 0 | |
| SAMPLE A-6 | 0 | |
| SAMPLE A-7 | 0 | |
| SAMPLE A-8 | 0 | |
| SAMPLE A-9 | 1 | SCRATCH |
| SAMPLE A-10 | 0 | |
| SAMPLE A-11 | 0 | |
| SAMPLE A-12 | 3 | CUT AND SCRATCH |
| SAMPLE A-13 | 0 | |
| SAMPLE A-14 | 0 | |
| SAMPLE A-15 | 2 | DIRT |
| SAMPLE A-16 | 0 | |
| SAMPLE A-17 | 1 | RUST |
| SAMPLE A-18 | 3 | CUT |
| SAMPLE A-19 | 3 | SCRATCH |
| SAMPLE A-20 | 0 | |
| ... | ... | ... |

[GROUP B]

| SAMPLE NAME | NUMBER OF FLAW IMAGES | FLAW TYPE |
|---|---|---|
| SAMPLE B-1 | 2 | CUT |
| SAMPLE B-2 | 0 | |
| SAMPLE B-3 | 3 | SCRATCH AND DIRT |
| SAMPLE B-4 | 2 | DIRT |
| SAMPLE B-5 | 0 | |
| SAMPLE B-6 | 0 | |
| SAMPLE B-7 | 0 | |
| SAMPLE B-8 | 0 | |
| SAMPLE B-9 | 0 | |
| SAMPLE B-10 | 0 | |
| SAMPLE B-11 | 2 | CUT |
| SAMPLE B-12 | 0 | |
| SAMPLE B-13 | 0 | |
| SAMPLE B-14 | 1 | SCRATCH |
| SAMPLE B-15 | 0 | |
| SAMPLE B-16 | 1 | RUST |
| SAMPLE B-17 | 2 | CUT |
| SAMPLE B-18 | 2 | RUST |
| SAMPLE B-19 | 0 | |
| SAMPLE B-20 | 0 | |
| ... | ... | ... |

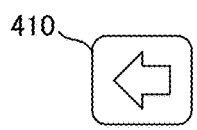 410
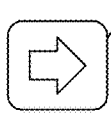 420

[GROUP A]

| SAMPLE NAME | NUMBER OF FLAW IMAGES | FLAW TYPE |
|---|---|---|
| SAMPLE A-1 | 2 | CUT AND SCRATCH |
| SAMPLE A-2 | 0 | |
| SAMPLE A-3 | 0 | |
| SAMPLE A-4 | 0 | |
| SAMPLE A-5 | 0 | |
| SAMPLE A-6 | 0 | |
| SAMPLE A-7 | 0 | |
| SAMPLE A-8 | 0 | |
| SAMPLE A-9 | 1 | SCRATCH |
| SAMPLE A-10 | 0 | |
| SAMPLE A-11 | 0 | |
| SAMPLE A-12 | 3 | CUT AND SCRATCH |
| SAMPLE A-13 | 0 | |
| SAMPLE A-14 | 0 | |
| SAMPLE A-15 | 2 | DIRT |
| SAMPLE A-16 | 0 | |
| SAMPLE A-17 | 1 | RUST |
| SAMPLE A-18 | 3 | CUT |
| SAMPLE A-19 | 3 | SCRATCH |
| SAMPLE A-20 | 0 | |
| ... | ... | ... |

[GROUP B]

| SAMPLE NAME | NUMBER OF FLAW IMAGES | FLAW TYPE |
|---|---|---|
| SAMPLE B-1 | 2 | CUT |
| SAMPLE B-2 | 0 | |
| SAMPLE B-3 | 3 | SCRATCH AND DIRT |
| SAMPLE B-4 | 2 | DIRT |
| SAMPLE B-5 | 0 | |
| SAMPLE B-6 | 0 | |
| SAMPLE B-7 | 0 | |
| SAMPLE B-8 | 0 | |
| SAMPLE B-9 | 0 | |
| SAMPLE B-10 | 0 | |
| SAMPLE B-11 | 2 | CUT |
| SAMPLE B-12 | 0 | |
| SAMPLE B-13 | 0 | |
| SAMPLE B-14 | 1 | SCRATCH |
| SAMPLE B-15 | 0 | |
| SAMPLE B-16 | 1 | RUST |
| SAMPLE B-17 | 2 | CUT |
| SAMPLE B-18 | 2 | RUST |
| SAMPLE B-19 | 0 | |
| SAMPLE B-20 | 0 | |
| ... | ... | ... |

400

DRAG AND DROP OPERATION

FIG. 11
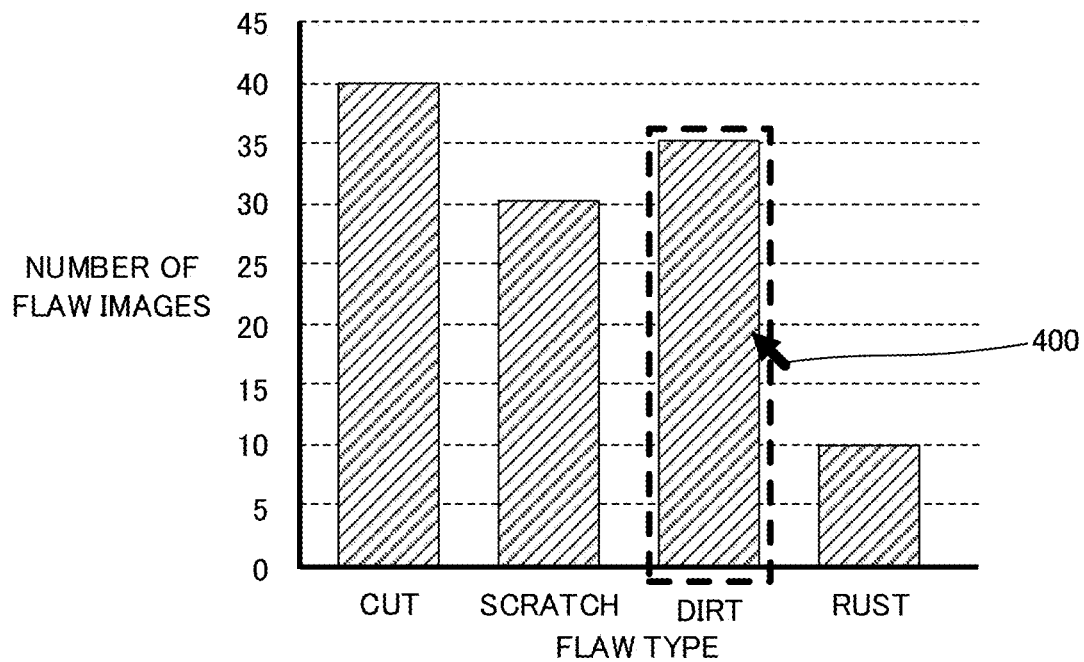
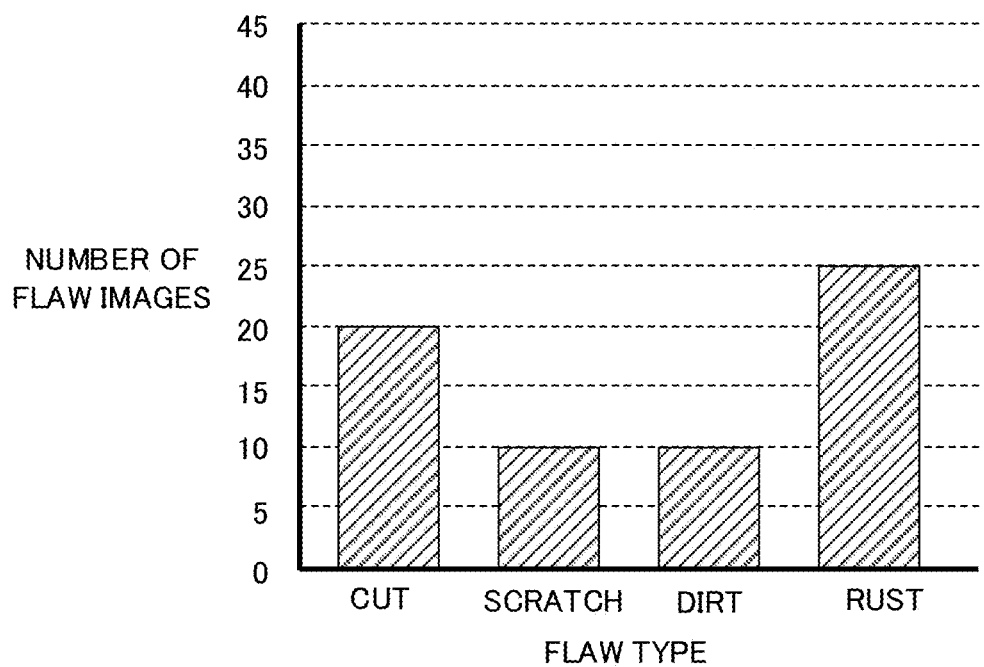

FIG. 12
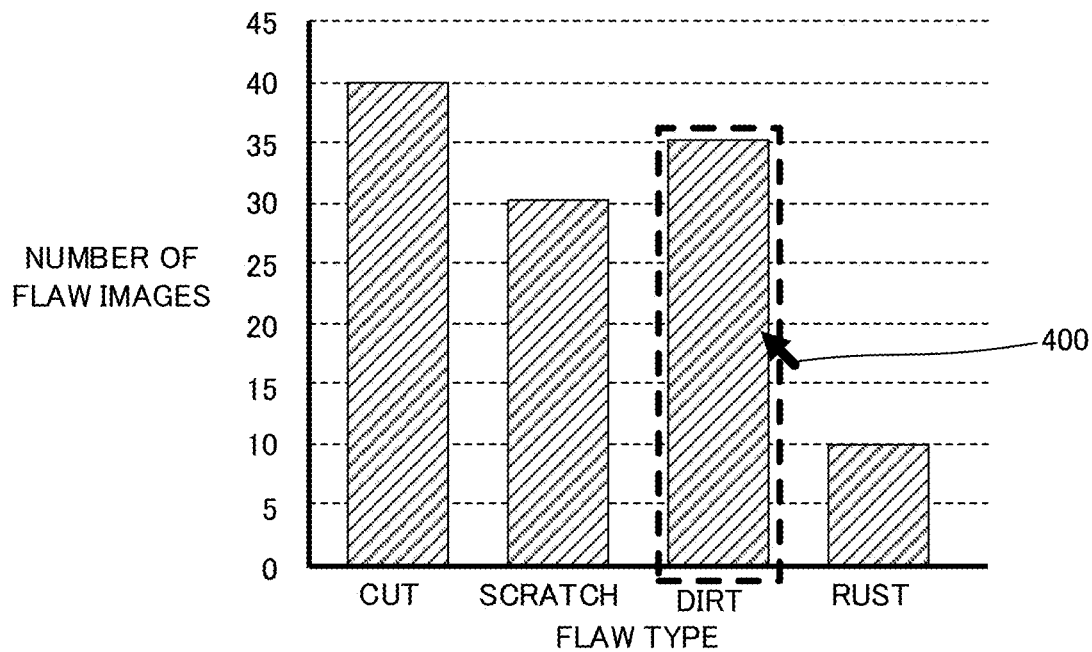
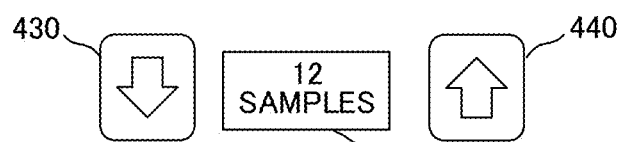
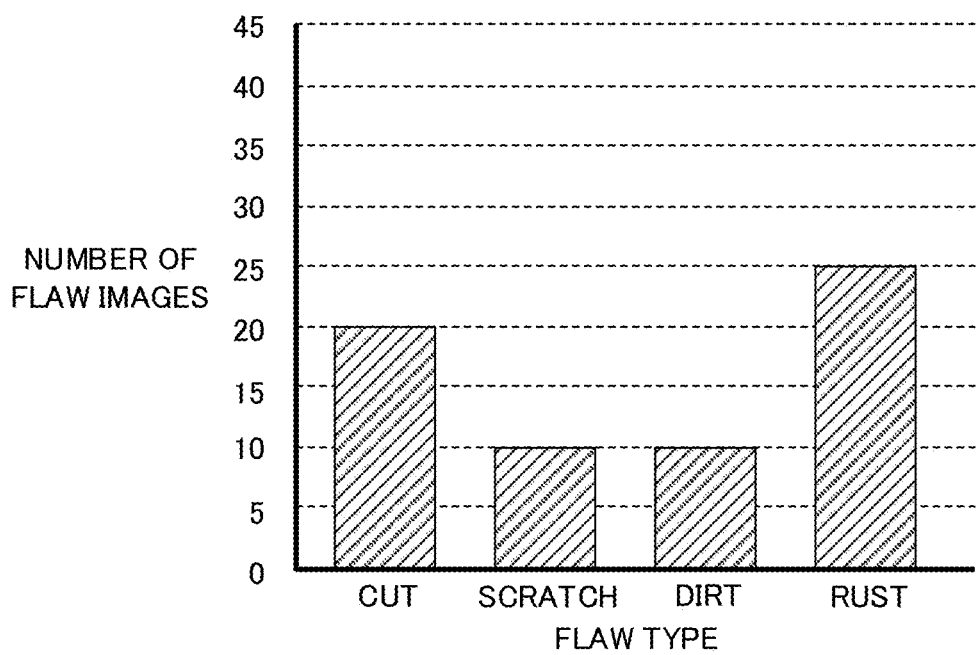

FIG. 13
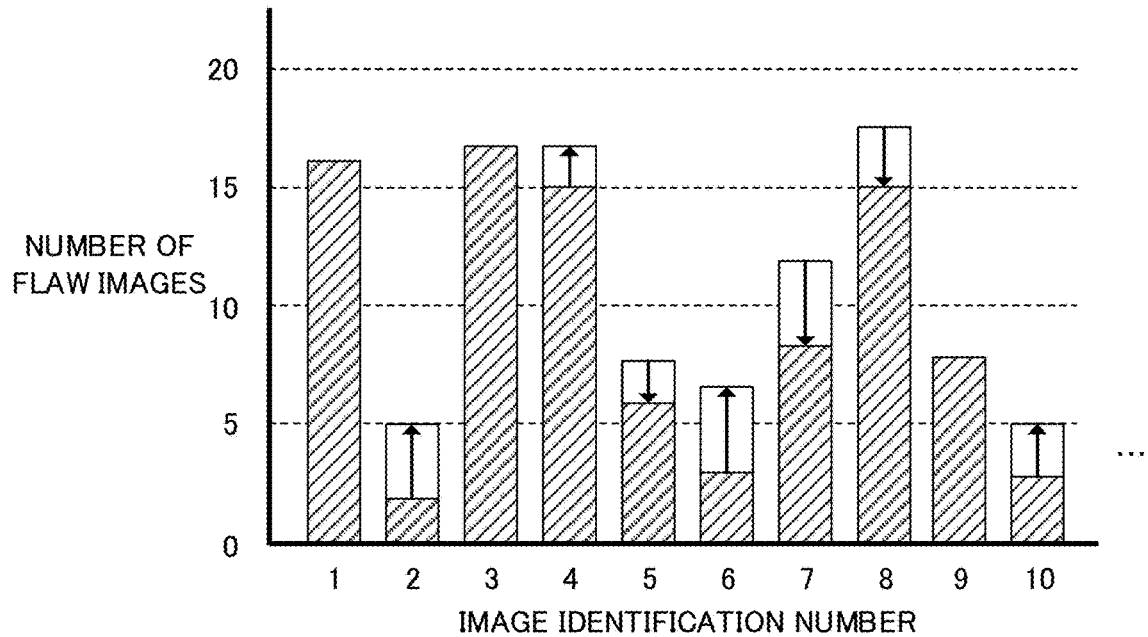
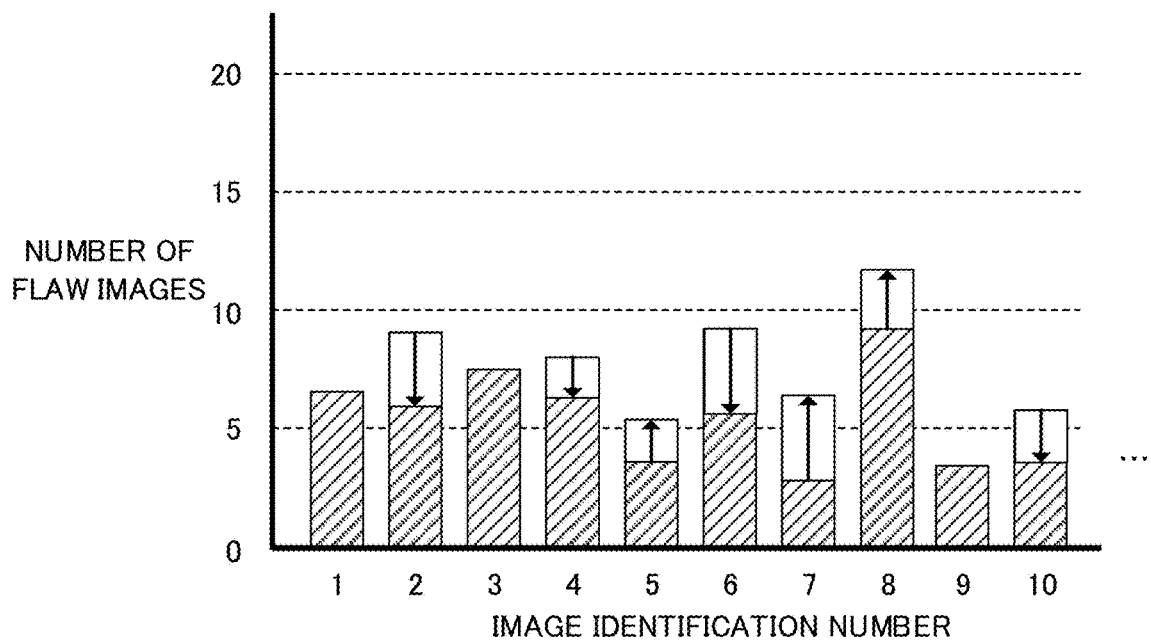
DO YOU WANT TO CHANGE DIVISION
DESTINATION OF SAMPLES?
Yes   No

METHOD FOR DISPLAYING, USER INTERFACE UNIT, DISPLAY DEVICE AND INSPECTION APPARATUS

RELATED APPLICATIONS

The present application claims priority to Japanese Patent Application Number 2019-065700 filed Mar. 29, 2019, the disclosure of which is hereby incorporated by reference herein in its entirety.

BACKGROUND OF THE INVENTION

1. Field of the Invention

The present disclosure relates to a method for displaying, a user interface unit, a display device and an inspection apparatus.

2. Description of the Related Art

In manufacturing sites, such as factories, for example, a process of inspecting whether a manufactured product is a non-defective product or a defective product, or an object detection process for products flowing on a line is performed. In the related art, these various inspection operations are performed by the visual examination of an experienced operator or with reference to a value detected by a sensor. However, the manual inspection operation has a problem that detection accuracy varies due to a difference in judgment criteria based on a difference in the experience of each operator or the lack of concentration caused by a change in physical conditions. Therefore, in many manufacturing sites, an inspection apparatus that performs an inspection on the basis of data, such as an image of a target object detected by a sensor or the like, is introduced in various inspection operations. The inspection apparatus uses a machine learning technique in order to automatically determine whether or not a product is defective.

In machine learning, learning is performed using collected data to generate a learning model. Then, for example, an inference process is performed on the basis of the data of a target object using the generated learning model to inspect the target object. In order to generate a good learning model in the machine learning, it is necessary to perform learning with high-quality data and to perform evaluation with high-quality data. In addition, the inference results of evaluation data are analyzed to evaluate the quality of the learning model generated by the machine learning. At this time, in a case in which data used for learning is the same as data used for evaluation, a problem, such as over-learning (over-fitting), occurs and a generalization performance is lost. As a result, there is a problem that the quality of the learning model deteriorates. Therefore, it is desirable that data used for learning and data used for evaluation are different from each other. That is, it is necessary to divide the collected data into learning data and evaluation data.

JP2013-218725A and JP2008-059080A disclose conventional techniques that acquire high-quality data used for a machine learning device.

In a case in which a huge amount of data can be automatically acquired, for example, in a case in which data used for machine learning is acquired from the user of a cloud or a website, data acquired by a simple method, such as a method using a random number, may be divided into learning data and evaluation data. Even in this case, it is possible to create high-quality learning data and evaluation data with a small bias. However, in a case in which data acquired in a limited region, such as a factory, is used, it may be difficult to acquire an enormous amount of data due to the number of products produced and man-hours in the factory. Therefore, there is a concern that a bias will occur between learning data and evaluation data in the simple data division method. As a result, the finally generated model may be adversely affected by the bias.

An enormous amount of data is not acquired in the factory, but the amount of data is still extremely large for a manual operation. Therefore, a large number of man-hours are required for an operation with a normal file system. In addition, in a case in which one data sample includes multidimensional data, manual adjustment requires a lot of effort. Therefore, there is a risk that data with a bias will be used for learning due to the user's lack of checking data.

Therefore, a method for displaying, a user interface unit, a display device and an inspection apparatus that support the division of the acquired data into learning data and evaluation data without any bias are desired.

SUMMARY OF THE INVENTION

In a method for displaying according to an aspect of the present disclosure, data groups into which data acquired for machine learning is divided are displayed statistically and visually to efficiently show a data division situation to a user. Therefore, it is possible to prevent the divided data from being used in a biased state and to solve the above problems. The data handled by a method for displaying according to an aspect of the present disclosure is data acquired in an environment such as a factory. The amount of data acquired in the factory is not enormous, but is a certain amount of data. In the present disclosure, a process of increasing visibility, such as sorting, filtering, or making a statistical graph, is performed for the data and the processed data is shown to the user such that the user can easily recognize the bias of the data. In addition, the method for displaying according to an aspect of the present disclosure displays a plurality of data groups in the same format/on the basis of the same standard to facilitate the comparison between the groups.

According to an aspect of the present disclosure, there is provided a method for displaying including: creating group data obtained by dividing a plurality of samples into a plurality of groups; performing a statistical process for the samples divided into each of the groups to calculate data indicating a statistical state of a predetermined data item between the groups; and displaying the statistical state in a display format enabling recognition of the statistical state between the groups on the basis of the data indicating the statistical state of the predetermined data item between the groups.

The method for displaying according to an aspect of the present disclosure enables the user to adjust data between the groups on the screen and to complete the division of data without any bias under the support of the above-mentioned data division.

BRIEF DESCRIPTION OF THE DRAWINGS

The objects and features of the present disclosure will become apparent from the following description of embodiments with reference to the accompanying drawings in which:

FIG. 3 is a diagram illustrating an example of image data acquired in the appearance inspection of a component by image recognition;

FIG. 4 is a diagram illustrating an example in which a statistical state of each group related to the type of flaw is displayed in a histogram format;

FIG. 5 is a diagram illustrating an example in which the statistical state of each group related to the type of image identification number is displayed in a histogram format;

FIG. 6 is a diagram illustrating an example in which the statistical state of each group related to the number of flaw images and the type of flaw is displayed in a list format;

FIG. 9 is a diagram illustrating an example of an interface for performing an operation of changing a division destination of a designated sample;

FIG. 10 is a diagram illustrating another example of the interface for performing the operation of changing the division destination of the designated sample;

FIG. 11 is a diagram illustrating still another example of the interface for performing the operation of changing the division destination of the designated sample;

FIG. 12 is a diagram illustrating an example of an interface for performing an operation of changing the division destination of a predetermined number of samples;

FIG. 13 is a diagram illustrating an example of the display of a change in the statistical state of a predetermined data item;

DETAILED DESCRIPTION OF THE PREFERRED EMBODIMENTS

Hereinafter, embodiments of the present disclosure will be described with reference to the drawings.

Figure 1:
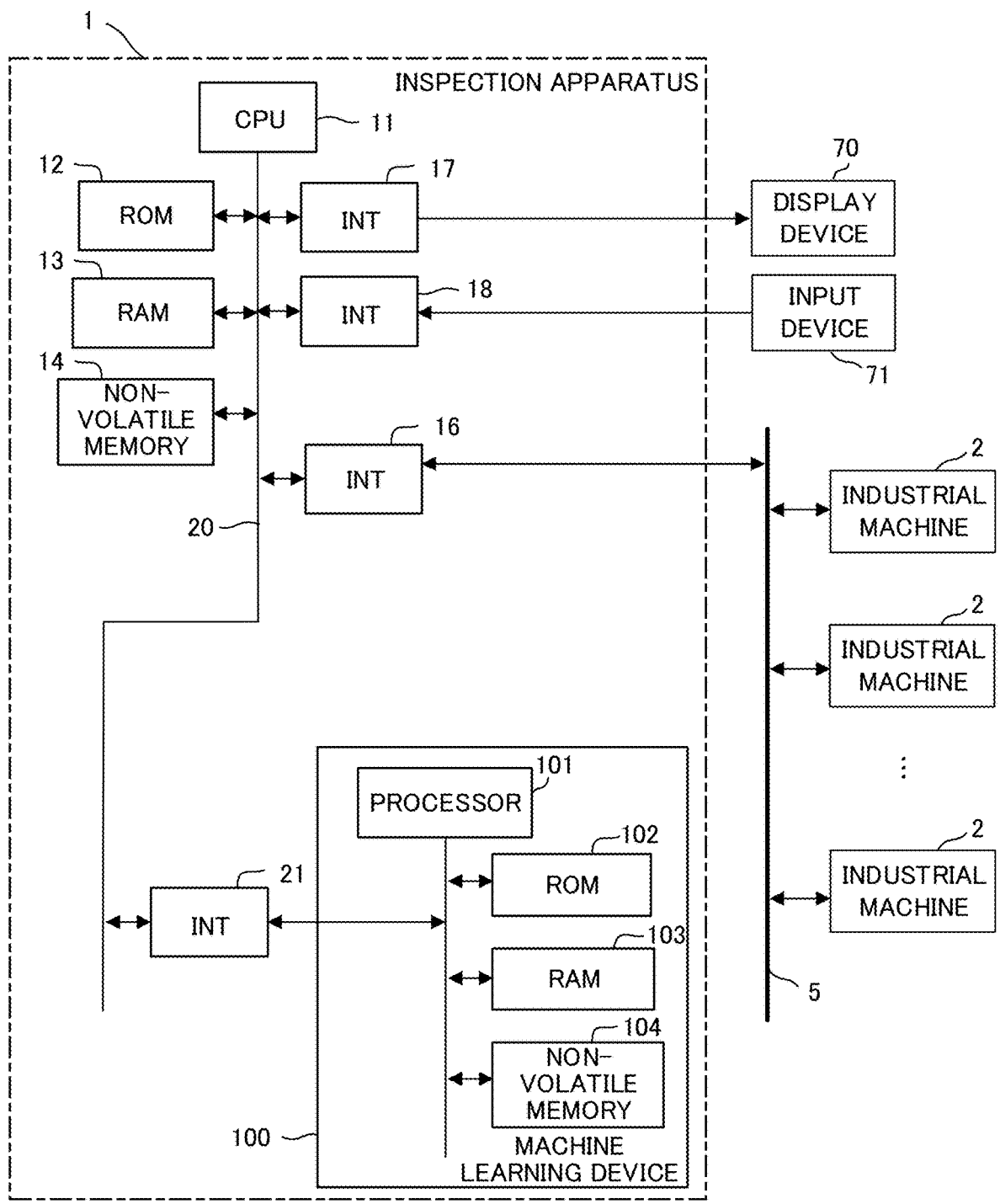
FIG. 1 is a diagram schematically illustrating the hardware configuration of an inspection apparatus according to an embodiment.

FIG. 1 is a diagram schematically illustrating the hardware configuration of an inspection apparatus including a machine learning device according to an embodiment. An inspection apparatus 1 according to this embodiment can be mounted on a controller that controls an industrial machine 2 such as a transport machine or a robot. In addition, the inspection apparatus 1 according to this embodiment can be mounted on a computer, such as a personal computer that is provided next to the controller controlling the industrial machine 2, such as a transport machine or a robot, or an edge computer, a fog computer, or a cloud server that is connected to the controller through a wired/wireless network. In this embodiment, the inspection apparatus 1 is mounted on a computer that is connected to the controller controlling the industrial machine 2, such as a transport machine or a robot, through the wired/wireless network.

A central processing unit (CPU) 11 included in the inspection apparatus 1 according to this embodiment is a processor that controls the overall operation of the inspection apparatus 1. The CPU 11 reads a system program stored in a read only memory (ROM) 12 through a bus 20 and controls the entire inspection apparatus 1 according to the system program. A random access memory (RAM) 13 temporarily stores, for example, temporary calculation data and various kinds of data input by an operator through an input device 71.

A non-volatile memory 14 is, for example, a memory which is backed up by a battery (not illustrated) or a solid state drive (SSD). A stored state is maintained in the non-volatile memory 14 even when the inspection apparatus 1 is turned off. The non-volatile memory 14 has a setting region in which setting information related to the operation of the inspection apparatus 1 is stored. In addition, the non-volatile memory 14 stores data input from the input device 71, data (for example, image data, audio data, time-series data, numerical data, and character data) acquired from the industrial machine 2, data acquired from a machine learning device 100, and data read through an external storage device (not illustrated) or a network. The programs and various kinds of data stored in the non-volatile memory 14 may be loaded in the RAM 13 at the time of execution/use. In addition, the system program including a known analysis program for analyzing various kinds of data is written to the ROM 12 in advance.

Figure 16:
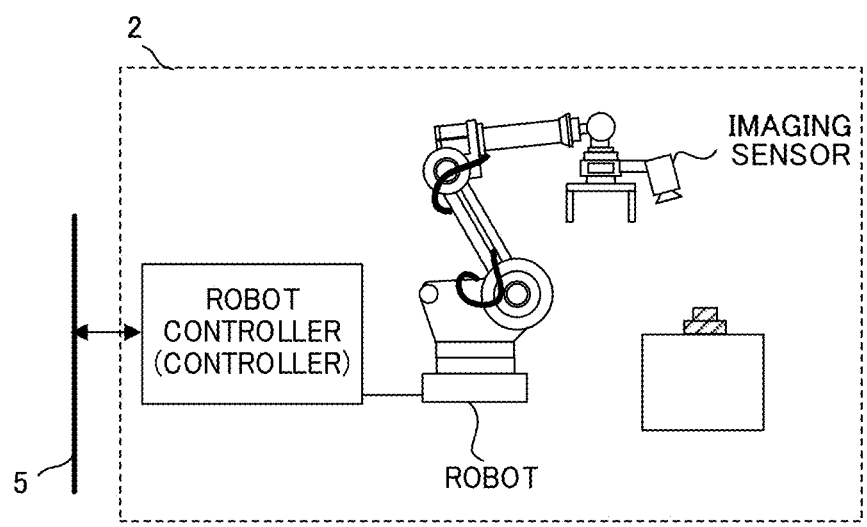
FIG. 16 is a diagram illustrating an example of an industrial machine.

Examples of the industrial machine 2 include machine tools, transport machines, robots, mining machines, woodworking machines, agricultural machines, and construction machines. The industrial machine 2 is configured so as to acquire information related to the operation of each unit such as a motor. In addition, sensors, such as an imaging sensor and a voice sensor, are attached to the industrial machine 2. The industrial machine 2 is configured to acquire information necessary for operations. For example, as illustrated in FIG. 16, the industrial machine 2 includes, for example, a robot provided with an imaging sensor and a robot controller that controls the robot. The industrial machine 2 can acquire image data of an object, such as a work, captured by the imaging sensor. The information acquired by the industrial machine 2 is acquired by the inspection apparatus 1 through a wired/wireless network 5 and an interface 16 and is stored in, for example, the RAM 13 and the non-volatile memory 14. In addition, the inspection apparatus 1 outputs a predetermined control signal to the industrial machine 2 through the interface 16 and the network 5 if necessary.

For example, each data piece read onto the memory, data obtained by executing a program or the like, and data output from the machine learning device 100 which will be described below are output and displayed on a display device 70 through an interface 17. In addition, the input device 71, such as a keyboard or a pointing device, transmits, for example, commands and data based on the operation performed by the operator to the CPU 11 through an interface 18.

An interface 21 is used to connect each unit of the inspection apparatus 1 and the machine learning device 100. The machine learning device 100 performs machine learning using a feature amount acquired in the operating environment of, for example, the industrial machine 2. For example, the machine learning device 100 generates and stores a learning model in which a predetermined result is associated with the acquired feature amount and performs an inference process using the learning model. The machine learning device 100 includes a processor 101 that controls the overall operation of the machine learning device 100, a ROM 102 that stores, for example, a system program, a RAM 103 that stores temporary data in each process related to the machine learning, and a non-volatile memory 104 that is used to store, for example, the learning model. The machine learning device 100 can observe each information item (for example, image data, audio data, time-series data, numerical data, and character data acquired from the industrial machine 2 and data indicating the result of inference using the learning model) that can be acquired by the inspection apparatus 1 through the interface 21. In addition, the inspection apparatus 1 can acquire the processing result output from the machine learning device 100 through the interface 21 and can store or display the acquired result or can transmit the acquired result to another device through, for example, the network 5.

Figure 2:
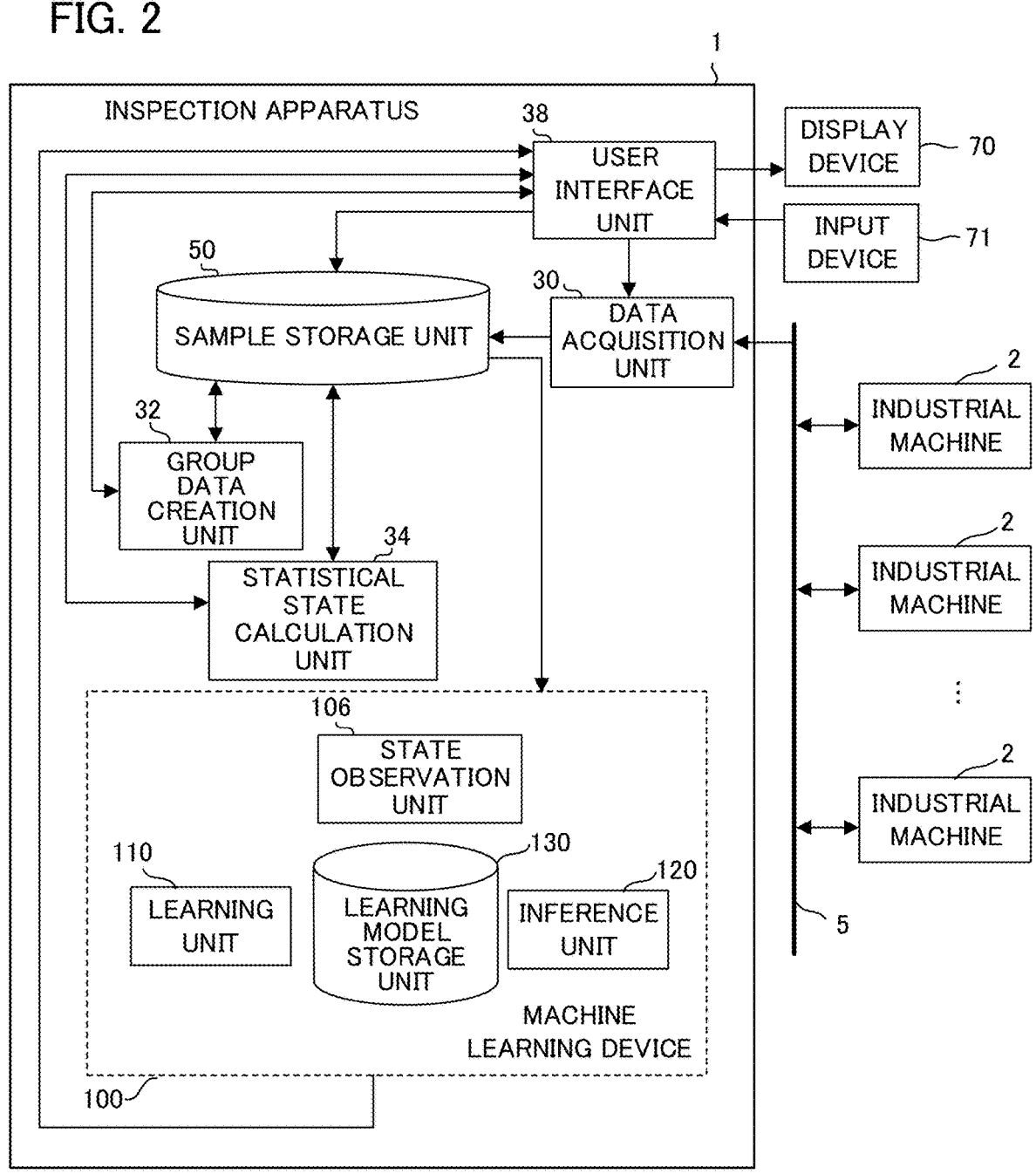
FIG. 2 is a schematic functional block diagram illustrating an inspection apparatus according to a first embodiment.

FIG. 2 is a schematic functional block diagram illustrating an inspection apparatus 1 and a machine learning device 100 according to a first embodiment. The CPU 11 of the inspection apparatus 1 illustrated in FIG. 1 and the processor 101 of the machine learning device 100 execute the system programs to control the operation of each unit of the inspection apparatus 1 and the machine learning device 100, thereby implementing each of the functions of the functional blocks illustrated in FIG. 2.

The inspection apparatus 1 according to this embodiment includes a data acquisition unit 30, a group data creation unit 32, a statistical state calculation unit 34, and a user interface unit 38. In addition, a sample storage unit 50 that stores data acquired by the data acquisition unit 30 is provided on the non-volatile memory 14.

The data acquisition unit 30 acquires various kinds of data from, for example, the industrial machine 2 and the input device 71. The data acquisition unit 30 acquires, for example, the image data, audio data, and temperature distribution data of a detection target acquired from a sensor provided in the industrial machine 2. In addition, the data acquisition unit 30 acquires time-series data of an operation sound of the industrial machine 2 and the voltage value/current value of the motor and labels (for example, numerical data and character data) assigned to each data piece by the operator. The data acquisition unit 30 stores the acquired data set as a sample in the sample storage unit 50. The data acquisition unit 30 may acquire data from another device through the external storage device (not illustrated) or the wired/wireless network 5.

The group data creation unit 32 divides the samples stored in the sample storage unit 50 into a plurality of groups. Hereinafter, the data of each group created by dividing the samples is referred to as group data. For example, the group data creation unit 32 divides the samples into a predetermined number of learning data groups and a predetermined number of evaluation data groups or divides the samples into learning data groups and evaluation data groups at a predetermined ratio. The information of dividing the samples into each group may be stored, for example, in a file or data directory structure or may be stored in a predetermined data structure, such as a JavaScript (registered trademark) Object Notation (JSON) format. The group data creation unit 32 may automatically divide a plurality of samples into a plurality of groups on the basis of a predetermined division rule to create group data. Further, the group data creation unit 32 may divide a plurality of samples into a plurality of groups on the basis of information related to the operation, which is performed by the operator for the input device 71 through the user interface unit 38, to create group data. It is desirable that the samples are divided such that data bias does not occur between the groups. However, in some cases, the bias is adjusted by the operator after the samples are divided. Therefore, in the stage in which the group data creation unit 32 divides the acquired data, for example, the groups into which the samples are to be divided may be determined by a random number. That is, the group data creation unit 32 does not necessarily perform the division using a division method that does not cause any bias.

The statistical state calculation unit 34 performs a statistical process for each sample group included in each group to create data indicating the statistical state of predetermined data items in each group. Here, the predetermined data items are items indicating the features of image data included in each sample and include items, such as an item indicating whether a flaw is present or absent, a flaw type, and an image identification number, which will be described below. Each data item has a predetermined data value. Among the data items, the "item indicating whether a flaw is present or absent" has a data value indicating "present" or "absent". Among the data items, the "flaw type" has data values indicating "cut", "scratch", "dirt", and "rust". Among the data items, the "image identification number" has a data value indicating figures in the image identification number. In addition, the statistical state calculation unit 34 creates data indicating the statistical state of the predetermined data item in a format that can be recognized by the operator. The statistical state calculation unit 34 performs, for example, a statistical process for a sample group included in each group to create data for indicating the number of samples related to the predetermined data item for each data value. Further, for example, the statistical state calculation unit 34 creates, for each data value of the predetermined data item, data indicating the proportion of samples having the data value to the total number of samples. In addition, for example, the statistical state calculation unit 34 creates data indicating the statistical value (for example, the variance value) of the number of acquired data pieces for each data value of the predetermined data item. The user interface unit 38 outputs the data indicating the statistical state of the predetermined data item of each group to the display device 70 in a display format (for example, a predetermined list format, a predetermined graph format, or a predetermined data distribution map) with which the statistical distribution of each data item can be recognized.

The user interface unit 38 displays the data created by the group data creation unit 32 on the display device 70 in a display format with which the operator can recognize the statistical state of each group. The data created by the group data creation unit 32 is group data and data indicating the statistical state of the predetermined data item of each group related to the sample group included in the group data. The user interface unit 38 may display the statistical state of the predetermined data item of each group on the display device 70 in a predetermined list format or a predetermined graph format. In this case, the user interface unit 38 can display the statistical value of each sample group included in a plurality of groups so as to be comparable between the groups. The user interface unit 38 may display the group data of each group or each data piece indicating the statistical state of the predetermined data item on the screen in the same display format (for example, the same list format or the same graph format) so as to be arranged side by side in the vertical direction or the horizontal direction. Therefore, the user interface unit 38 can display the statistical state of the predetermined data item of each group so as to be recognized by the operator.

When displaying the group data or the data indicating the statistical state, the user interface unit 38 may provide a display operation interface for changing the detailed display of each data piece or the arrangement of data pieces. Further, for example, in a case in which the group data or the data indicating the statistical state is displayed in a predetermined list format and the column name of a predetermined data item in the list is selected, the user interface unit 38 may sort the data values of the data items corresponding to the column name in ascending or descending order. Further, in a case in which the group data or the data indicating the statistical state is displayed in a predetermined list format and the data value of a predetermined data item is designated, the user interface unit 38 may perform filtering display for displaying only data having the same data value as the designated data value. In addition, in a case in which the group data of a plurality of groups and the data indicating the statistical state are displayed at the same time and display operations, such as the sorting and the filtering, are performed for predetermined group data, the display operations may be applied to all the groups in synchronization. For example, in a case in which data of a group A and data of a group B are displayed on the screen in a list format at the same time and the sorting operation or the filtering display operation is performed on the list of one of the groups, the user interface unit 38 may perform the same sorting or filtering display on the list of the other group.

The user interface unit 38 may provide an interface for display operations, such as the enlargement or reduction of display in a list format or a graph format and movement in the vertical and horizontal directions, when displaying the group data or the data indicating the statistical state. In addition, for example, in a case in which group data pieces of a plurality of groups are displayed at the same time or in a case in which data pieces indicating the statistical states of a plurality of groups are displayed at the same time, the display operation which has been performed for the data of a predetermined group may be applied to all the groups in synchronization. For example, in a case in which the data of the group A and the data of the group B are displayed on the screen in a histogram format at the same time and an operation, such as enlargement, reduction, or movement in the vertical and horizontal directions, is performed on the histogram of one group, the user interface unit 38 may perform the same operation, such as enlargement, reduction, or movement in the vertical and horizontal directions, on the histogram of the other group.

Here, the operations of the group data creation unit 32, the statistical state calculation unit 34, and the user interface unit 38 will be described. Here, a case in which acquisition data acquired in the appearance inspection of a component by image recognition is treated will be described as an example. The appearance inspection of a component by image recognition according to this embodiment is an inspection for detecting, for example, the flaw, dirt, or loss of a component using the image data of the component captured by an imaging device such as a camera. In recent years, it has been known that a method using machine learning, such as deep learning, other than simple image recognition is effective in the inspection (for example: one or more image data pieces and data indicating whether a flaw associated with the image data is present or absent are assigned for one sample as training data, learning is performed, and a model obtained by the learning is used to detect a flaw).

FIG. 3 is a diagram illustrating an example of the image data acquired in the appearance inspection of a component by image recognition. In the example illustrated in FIG. 3, a plurality of data pieces acquired from one component as an inspection target is managed as one sample. As described above, one sample includes a plurality of image data pieces acquired from one component as an inspection target. The plurality of image data pieces included in one sample may include, for example, image data obtained by imaging at different imaging positions (for example, imaging positions A to D in FIG. 3), image data obtained by imaging using different imaging methods (for example, imaging performed while changing the position of a light source and imaging using infrared thermography), and image data subjected to different types of image processing (for example, edge detection and level adjustment). Further, each image data piece is associated with a data item indicating, for example, whether a flaw is present or absent or the type of flaw which has been determined by a predetermined analysis process or a visual inspection by the operator. The image data in the sample is associated with an image identification number that can uniquely identify each image data piece in the sample. Furthermore, it is assumed that the same image identification number is assigned to the image data of the same format which has been captured by the same imaging method at the same imaging position and then subjected to the same image processing in each sample.

In this embodiment, the group data creation unit 32 divides a plurality of samples stored in the sample storage unit 50 into the group A (learning data group) and the group B (evaluation data group). For example, the group data creation unit 32 divides a predetermined number of samples (the number of samples required for generating a learning model) randomly selected from the plurality of samples stored in the sample storage unit 50 into the group A and divides the remaining samples into the group B.

Then, the statistical state calculation unit 34 performs a predetermined statistical process for each sample group included in each group to calculate data indicating the statistical state of a predetermined data item related to the sample group. For example, the statistical state calculation unit 34 calculates the following data for each group from the data item associated with the image data included in each sample:

The number of images with a flaw or without a flaw in samples of each group;
The number of images for each flaw type in samples of each group; and
The number of images with a flaw for each image identification number in samples of each group.

Then, the user interface unit 38 displays data indicating the statistical state of each data item created by the statistical state calculation unit 34 on the display device 70, for example, in a predetermined list format or a predetermined graph format (for example, a histogram, a pie chart, or a line graph).

FIG. 4 illustrates an example in which the number of flaw images is displayed for each flaw type in a histogram format among the image data pieces included in the samples belonging to each group. FIG. 5 illustrates an example in which the number of flaw images is displayed for each image identification number in a histogram format among the image data pieces included in the samples belonging to each group. FIG. 6 illustrates an example in which the names of the samples belonging to each group, the number of flaw images, and a flaw type are displayed in a list format.

The statistical state of predetermined data items related to the sample groups included in each group is displayed on the display device 70 in the list format or the graph format. Therefore, the operator can check at a glance whether the data values of the predetermined data items are distributed in each group with a good balance or are biased to a specific data value. For example, it is understood by the display in the graph format illustrated in FIG. 4 that, for the data item of the flaw type, the group A includes a large number of samples having image data associated with scratch and dirt as the data values. In addition, it is understood that the group B includes a large number of samples having image data associated with rust as the data value. In general, it is desirable that the data values of all data items are distributed to each group with a good balance, without being biased to a specific value, in the learning data group used for machine learning and the evaluation data group. In the embodiment according to the present disclosure, data is displayed on the display device 70 in a list format or a graph format on the basis of the data created by the statistical state calculation unit 34. Therefore, the operator can easily recognize whether it is necessary to correct the bias of the number of data pieces between the groups for all data items.

The machine learning device 100 includes a state observation unit 106, a learning unit 110, and an inference unit 120. In addition, a learning model storage unit 130 that stores a learning model generated as the result of learning by the learning unit 110 is provided on the non-volatile memory 104.

When the machine learning device 100 operates in a learning mode, the state observation unit 106 acquires information of each of the samples divided into a plurality of groups by the group data creation unit 32 as a feature amount for learning from the sample storage unit 50. In addition, the state observation unit 106 acquires data required for learning, such as label data of each sample, from the sample storage unit 50 according to the learning mode performed by the learning unit 110.

In contrast, when the machine learning device 100 operates in an inference mode, the state observation unit 106 acquires the information of the samples divided into a plurality of groups by the group data creation unit 32 as a feature amount for inference.

The learning unit 110 performs machine learning using the feature amount for learning acquired by the state observation unit 106 and the data required for learning, such as label data, which is used if necessary. The learning unit 110 generates a learning model by performing machine learning on the basis of the data acquired by the state observation unit 106 using a known machine learning method such as unsupervised learning or supervised learning. The learning unit 110 stores the generated learning model in the learning model storage unit 130. The unsupervised learning method performed by the learning unit 110 is, for example, an autoencoder method or a k-means method. The supervised learning performed by the learning unit 110 is, for example, a multilayer perceptron method, a convolutional neural network method, a support vector machine method, or a random forest method.

The inference unit 120 performs an inference process using the learning model stored in the learning model storage unit 130 on the basis of the feature amount for inference acquired by the state observation unit 106. The inference unit 120 according to this embodiment inputs the feature amount input from the state observation unit 106 to the learning model (parameters have been determined) generated by the learning unit 110 to calculate a predetermined inference result for the feature amount.

The operator checks the content displayed on the display device 70 by the user interface unit 38 such that the statistical state of each group is recognized and appropriately changes and adjusts the groups into which the samples stored in the sample storage unit 50 are divided. The machine learning device 100 performs machine learning using the samples included in the learning group adjusted by the operator. In addition, an inference process using the samples included in the adjusted evaluation group can be performed using the generated learning model and the validity of the learning model can be verified using the result of the inference process.

Figure 7:
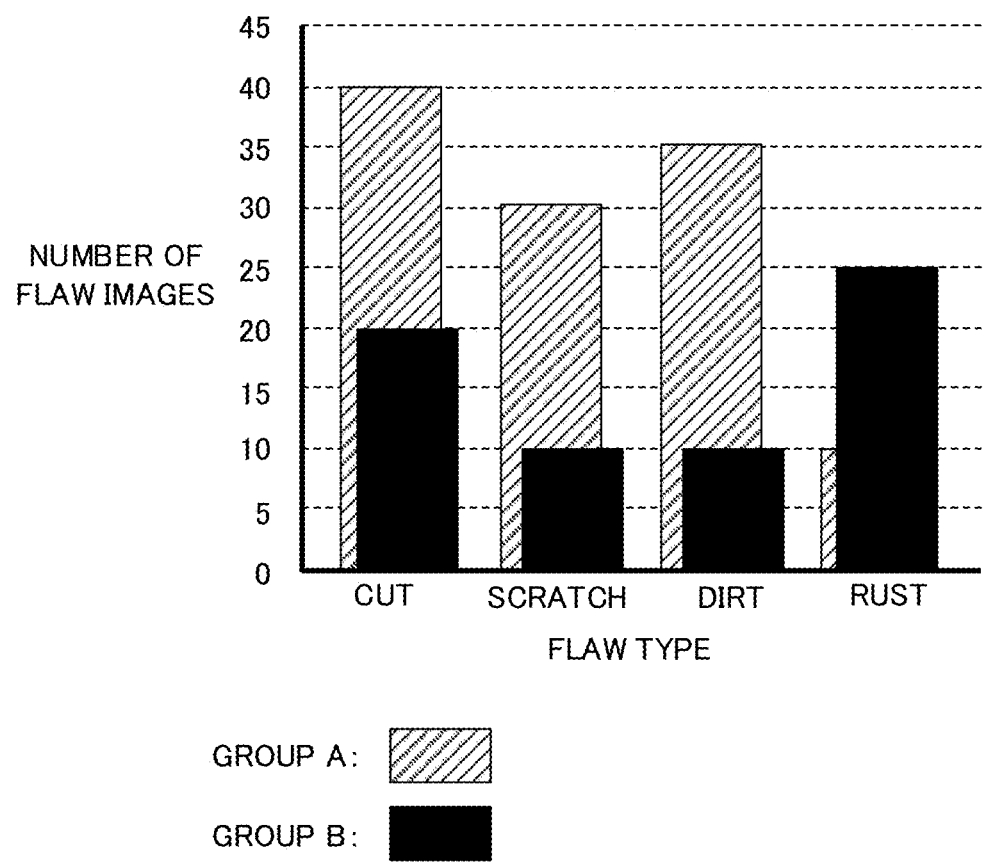
FIG. 7 is a diagram illustrating a modification example in which the statistical state of each group related to the type of flaw is displayed in a histogram format.

As a modification example of the inspection apparatus 1 according to this embodiment, the user interface unit 38 can display the group data of each group and the data indicating the statistical state of each predetermined data item on the screen at the same time. In this case, the user interface unit 38 may display data related to the items corresponding between the groups so as to be adjacent to each other or to be superimposed on each other. FIG. 7 is an example in which the items corresponding between the groups are superimposed on each other in a graph (see FIG. 4) that displays the number of flaw images in a histogram format for each flaw type. This display enables the operator to more easily compare data between the groups.

Figure 8:
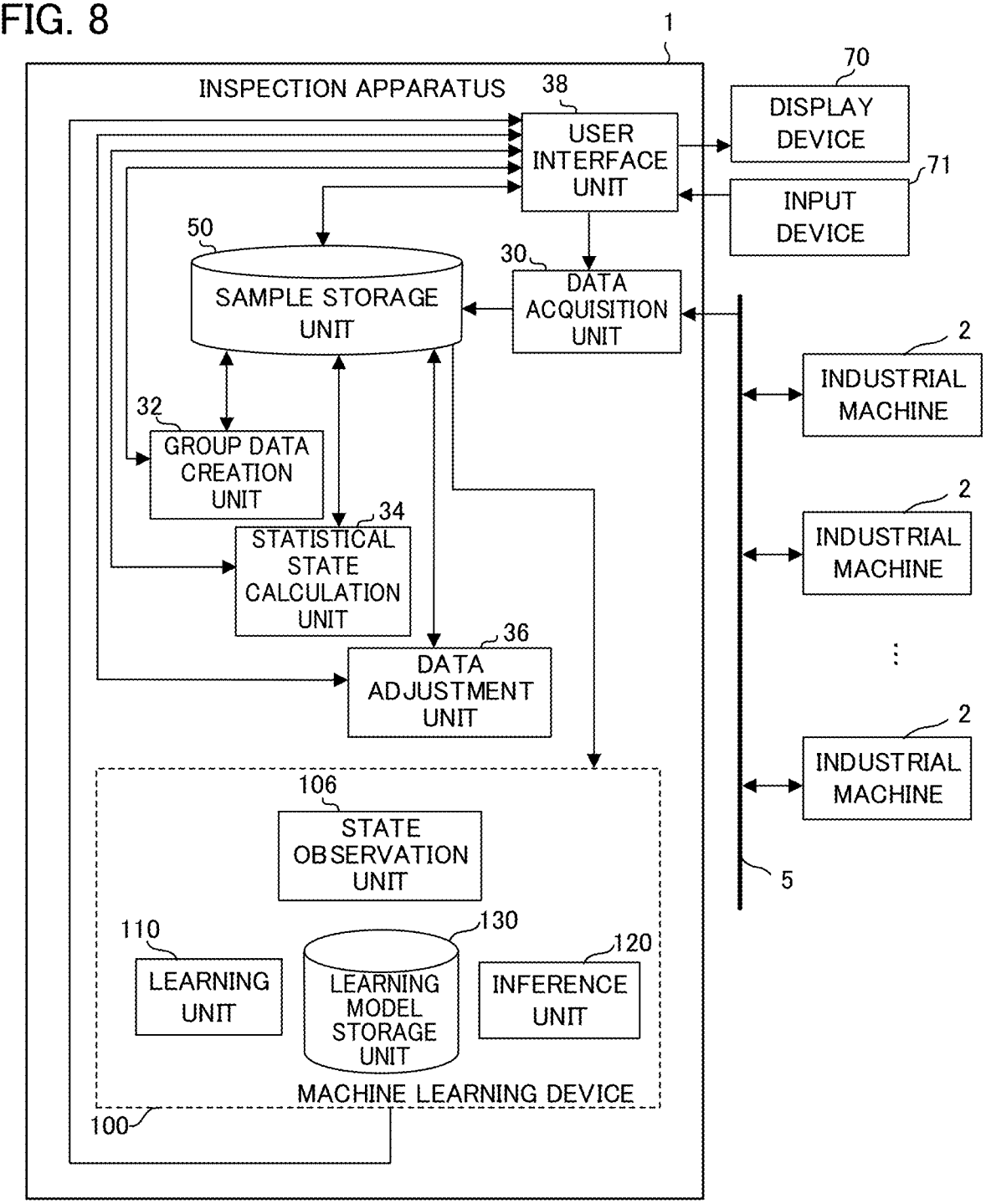
FIG. 8 is a schematic functional block diagram illustrating an inspection apparatus according to a second embodiment.

FIG. 8 is a schematic functional block diagram illustrating an inspection apparatus 1 and a machine learning device 100 according to a second embodiment. The CPU 11 of the inspection apparatus 1 illustrated in FIG. 1 and the processor 101 of the machine learning device 100 execute the system programs to control the operation of each unit of the inspection apparatus 1 and the machine learning device 100, thereby implementing each of the functions of the functional blocks illustrated in FIG. 8.

The inspection apparatus 1 according to this embodiment includes a data adjustment unit 36 in addition to each means included in the inspection apparatus 1 according to the first embodiment.

The data adjustment unit 36 changes (adjusts) the groups to which each sample belongs in the group data created by the group data creation unit 32. For example, the data adjustment unit 36 may change (adjust) the groups to which the samples belong on the basis of the operation information of the input device 71 input by the operator through the user interface unit 38. In addition, the data adjustment unit 36 may automatically change (adjust) the groups to which the samples belong on the basis of a predetermined adjustment rule.

The user interface unit 38 according to this embodiment displays, on the display device 70, an operation interface for changing the group, to which each sample belongs, for the samples belonging to each group, in addition to the functions of the user interface unit 38 according to the first embodiment. The operation interface displayed by the user interface unit 38 may be an interface for performing an operation which specifies one or more samples belonging to each group and changes the group to which the samples belong. In addition, the operation interface displayed by the user interface unit 38 may be an interface for an operation which simultaneously changes the division destinations of a plurality of samples belonging to each group according to a predetermined rule. When detecting an input for the operation interface by the operator through the input device 71, the user interface unit 38 notifies the data adjustment unit 36 of a command for data adjustment corresponding to the input.

Hereinafter, an example in which the data adjustment unit 36 changes the group to which the samples belong on the basis of the operation information of the input device 71 input by the operator through the user interface unit 38 will be described with reference to FIGS. 9 to 11.

FIG. 9 illustrates a screen on which the number of flaw images and a flaw type are displayed for each sample belonging to each group in a list format. In addition, FIG. 9 is a diagram illustrating an example of an interface for performing an operation of changing the group to which a designated sample belongs. On the screen illustrated in FIG. 9, the operator can operate a cursor 400 through the input device 71 to select a sample in each group (for example, the operator can move the cursor 400 to the sample that the operator wants to select and press a space bar). In addition, in a state in which a predetermined sample is selected, a group change button 410 or 420 can be selected to change the group to which the selected sample belongs. In the example illustrated in FIG. 9, when a plurality of samples can be selected at the same time, the groups to which the plurality of selected samples belong may be changed at the same time.

FIG. 10 illustrates a screen on which the number of flaw images and a flaw type are displayed for each sample belonging to each group in a list format. In addition, FIG. 10 is a diagram illustrating another example of the interface for performing the operation of changing the group to which a designated sample belongs. On the screen illustrated in FIG. 10, the operator operates the cursor 400 through a pointing device as the input device 71. Therefore, the operator can select a sample in each group (for example, the operator can move the cursor 400 to the sample that the operator wants to select and press a button of the pointing device). In addition, in a state in which a sample is selected, the cursor 400 can be moved to another group list to change the group to which the selected sample belongs to a group which is a movement destination (for example, a drag and drop operation which moves the cursor to another group list by pressing the button of the pointing device in a state in which a sample is selected and releasing the button of the pointing device at a desired position). In the example illustrated in FIG. 10, in a case in which a plurality of samples can be selected at the same time, the groups to which the plurality of selected samples belong may be changed at the same time.

FIG. 11 illustrates a screen on which the number of flaw images is displayed in a histogram format for each flaw type included in the samples belonging to each group. FIG. 11 is a diagram illustrating an example of an interface for an operation of changing the group to which a designated sample belongs. On the screen illustrated in FIG. 11, the operator operates the cursor 400 through the pointing device as the input device 71. Therefore, the operator can select a histogram bar (a set of samples) for each group and select all of the samples included in the histogram bar at a time. The group to which all of the selected samples belong can be changed at a time by the selection of the group change button 410 or 420 and the drag and drop operation of the pointing device.

FIGS. 9 to 11 illustrate examples of the operation of changing the group into which the samples displayed in a list format or a graph format are divided. However, the present disclosure is not limited thereto. The operation of changing the group into which the samples are divided may be performed using both the display in the list format and the display in the graph format. For example, a graph indicating the statistical state of each group and a list of samples are displayed on the same screen at the same time. In this case, when the operator selects a set of samples to be adjusted on the graph, the corresponding samples are selected (for example, highlighted display) on the list. Then, adjustment, such as the deselection of data other than the data for changing the division destination on the list, is performed and then the division destination of the samples is changed. In this way, the division destination of the samples is efficiently changed.

The provision of the interface enables the operator to check the current division state of samples and to adjust the division state of data through the user interface in a case in which the division state of the samples does not reach the desired standard. Then, the user can appropriately divide the samples to perform high-quality machine learning.

Hereinafter, an example in which the data adjustment unit 36 automatically changes (adjusts) the group to which samples belong on the basis of a predetermined adjustment rule will be described.

In some cases, when the groups into which samples are divided are adjusted, a predetermined number of samples may be changed to another group without designating the individual samples from a specific group (for example, in FIG. 11, the operator wants to randomly extract 12 samples from the samples that include image data, in which dirt has been detected, in the group A and to change the extracted samples to the group B). Further, in some cases, it is necessary to perform an operation of dividing a plurality of samples belonging to a specific group into a plurality of other groups. Furthermore, in some cases, it is necessary to perform an operation of dividing undivided samples into a plurality of groups from newly acquired data.

In this case, the operator operates the input device 71 to select through the user interface unit 38 a sample group (input sample group) on the input side and a group (an output group or a plurality of groups) on the output side and instructs the data adjustment unit 36 to change the division destination of the samples included in the input sample group to the output group. For example, in a state in which a predetermined histogram bar is selected as illustrated in FIG. 12, an operation is performed which inputs the number of samples or a ratio to a predetermined population to a movement amount input field 450 and selects a group change button 430 or 440. In the example illustrated in FIG. 12, the predetermined population is a sample group corresponding to the histogram bar selected on the display screen.

However, when the group into which the samples are divided is randomly determined without considering the statistical state of data, a bias occurs in the statistical state of the data value of each data item between the groups and a large load is applied to the subsequent adjustment. In contrast, it is difficult for the operator to check all the statistical states and to select the sample whose division destination is to be changed. In order to solve this problem, it is necessary to provide the data adjustment unit 36 with an automatic sample dividing function.

For example, in the example illustrated in FIG. 12, the samples belonging to the group A include 35 image data pieces in which dirt has been detected. In this case, one sample may include one image data piece indicating dirt or may include a plurality of image data pieces indicating dirt. In addition, the sample including the image data indicating dirt is likely to include image data in which another flaw has been detected. When the image data is changed to another group, the group is changed in units of samples. Therefore, in a case in which 12 image data pieces indicating dirt are moved to the group B, the number of image data pieces in which cut, scratch, and rust have been detected in each group is also affected.

Therefore, in a case in which the operator designates a predetermined adjustment rule when instructing the data adjustment unit 36 to change the samples included in the input sample group to the output group through the user interface unit 38, the data adjustment unit 36 automatically determines a group into which each sample included in the input sample group is divided, according to the designated adjustment rule. In the example illustrated in FIG. 12, among the samples including the image data in which dirt has been detected, 12 samples are changed to the group B. This means that, among 35 samples including the image data in which dirt has been detected, 23 samples are divided (re-divided) into the group A and 12 samples are divided into the group B. The data adjustment unit 36 performs this process according to the designated adjustment rule.

As an example of the predetermined adjustment rule, the user interface unit 38 may allow the operator to designate a data item having priority during automatic division. When the adjustment rule is designated, the data adjustment unit 36 may determine the groups into which each sample is divided such that the numbers of samples having the data value of the data item having priority are equal to each other between the groups. When this adjustment rule can be designated, the data item having priority may be specified independently or a plurality of data items having priority may be designated such that there is a difference between the degrees of priority. When this adjustment rule is designated, for example, the data adjustment unit 36 provisionally determines the groups into which each sample is to be divided at random using a random number at the beginning. Then, when there is a bias in the elements of the data items having priority, the data adjustment unit 36 interchanges the samples between the groups. In a case in which a plurality of data items having priority are designated such that there is a difference between the degrees of priority, the interchange process is performed a plurality of times. At that time, the second and subsequent interchange processes are performed so as not to affect the ratio of the samples related to the data item having priority which has been the standard in the previous interchange process. There is a possibility that the target will not be achieved due to a restriction in a data item which is interchanged later (a data item set to have a lower priority). In this case, the operator may see the results and examine the method of giving priority again.

In a case in which a plurality of samples belonging to a specific group are divided into a plurality of other groups, a plurality of samples belonging to a specific group are selected as the input sample group and a plurality of other groups are selected as the output group. Therefore, it is possible to perform the same automatic division as that in the above-mentioned example.

Further, in a case in which newly acquired samples are divided into a plurality of groups, undivided samples are selected as the input sample group from newly acquired data and a plurality of division destinations are selected as the output groups. In this case, it is also possible to perform the same automatic division as that in the above-mentioned example.

As such, the operator can designate the standard for automatically dividing samples into each group in the form of an adjustment rule. Therefore, it is possible to perform automatic division in which the intention of the operator is reflected.

As a modification example of the inspection apparatus 1 according to this embodiment, before the operator determines to change the group to which the samples belong, a change in the group to which the samples belong may be displayed such that the operator can check how the statistical state of a predetermined data item changes. For example, when the division destination of the samples is changed on the basis of the operation of the operator, as illustrated in FIG. 13, how the statistical state of a predetermined data item changes is displayed as a change in the height of a histogram bar to the operator. In a case in which the operator selects to accept the change, the group to which the samples belong may be changed. One sample includes various kinds of data and a change in the group to which the samples belong may cause a change in the statistical state that is different from what the operator intends. In this case, the operator is forced to perform readjustment a plurality of times. In addition, in a case in which one sample includes multidimensional data, it is difficult for a person to correctly predict in advance all the influences of changing the division destination of the samples. Therefore, it is possible to efficiently perform adjustment by checking a change in the statistical state of a predetermined data item in each group from various viewpoints in advance.

As another modification example of the inspection apparatus 1 according to this embodiment, the automatic division method of the data adjustment unit 36 introduced in this embodiment may be used when the group data creation unit 32 divides samples into a plurality of groups at the beginning. In this case, the samples are divided into a plurality of groups as assumed by the operator to some extent in the stage in which the group data is created. Therefore, it is possible to reduce the number of readjustment processes.

Figure 14:
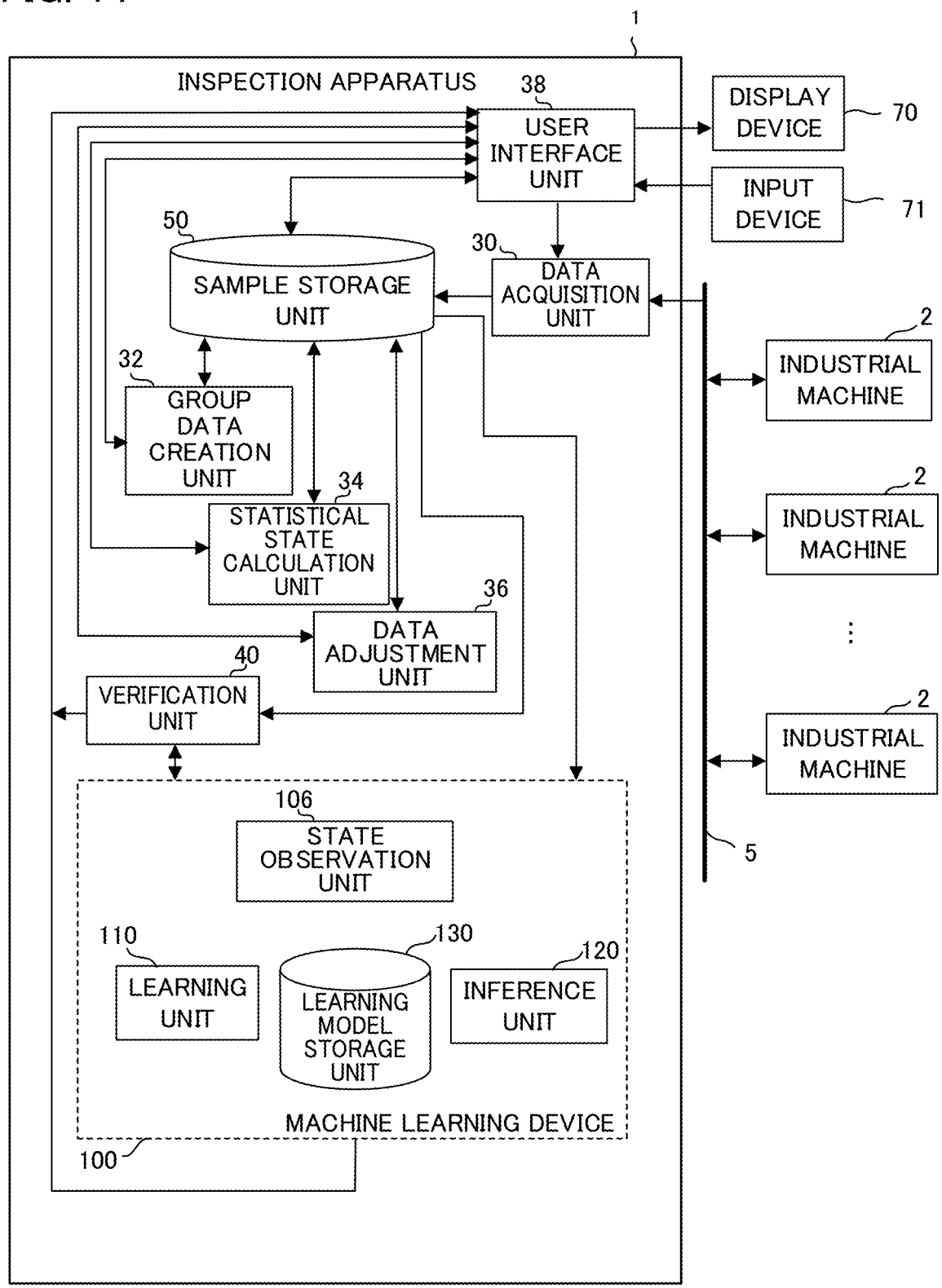
FIG. 14 is a schematic functional block diagram illustrating an inspection apparatus according to a third embodiment.

FIG. 14 is a schematic functional block diagram illustrating an inspection apparatus 1 and a machine learning device 100 according to a third embodiment. The CPU 11 of the inspection apparatus 1 illustrated in FIG. 1 and the processor 101 of the machine learning device 100 execute the system programs to control the operation of each unit of the inspection apparatus 1 and the machine learning device 100, thereby implementing each of the functions of the functional blocks illustrated in FIG. 14.

The inspection apparatus 1 according to this embodiment includes a verification unit 40 in addition to each unit included in the inspection apparatus 1 according to the second embodiment.

The verification unit 40 verifies the validity of the learning model generated as the result of the machine learning performed by the machine learning device 100 on the basis of the samples stored in the sample storage unit 50. The verification unit 40 verifies the validity of the learning model (evaluates the learning model) generated as the result of the machine learning performed using a learning data group on the basis of an evaluation data group, using a known verification method. After the group data creation unit 32 creates the learning data group and the evaluation data group and the data adjustment unit 36 adjusts the distribution of the samples divided into each group, the verification unit 40 verifies the estimation accuracy of the learning model. An example of the known verification method is a method of evaluating estimation accuracy when the learning model is applied to the samples included in the evaluation data group. Further, as another example, after the group data creation unit 32 divides samples into five groups and the data adjustment unit 36 adjusts the distribution of the samples divided into each group, the verification unit 40 performs verification (evaluates the learning model) using a verification method (for example, a cross-validation method) in which four groups are learning data groups and one group is an evaluation data group. The verification result by the verification unit 40 is displayed on the display device 70 through the user interface unit 38.

The embodiments of the present disclosure have been described above. However, the present disclosure is not limited to only the above-described embodiments and can be appropriately changed and embodied in various ways.

For example, in the above-described embodiments, the inspection apparatus 1 and the machine learning device 100 have different CPUs (processors). However, the machine learning device 100 may be implemented by the CPU 11 included in the inspection apparatus 1 and the system program stored in the ROM 12.

Further, in the above-described embodiments, the inspection apparatus 1 includes the machine learning device 100. However, the machine learning device 100 may be configured separately from the inspection apparatus 1 and the inspection apparatus and the machine learning device 100 may be connected to each other through the network 5.

Furthermore, in the above-described embodiments, a plurality of groups of samples created by the inspection apparatus 1 are used for machine learning. However, the groups of samples created by the inspection apparatus 1 according to the present disclosure may be used for other purposes than machine learning. For example, the groups of samples are used such that peripheral data, such as a measurement period, is associated with the samples in order to prevent data bias.

Figure 15:
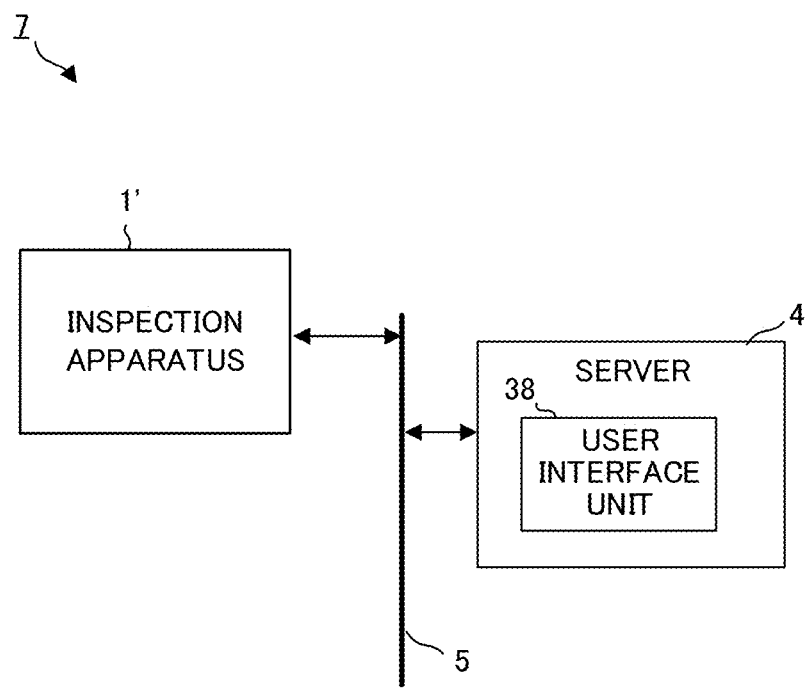
FIG. 15 is a diagram illustrating an example of an inspection system in which an inspection apparatus and a user interface unit are provided in different apparatuses.

In the above-described embodiments, the user interface unit 38 is provided in the inspection apparatus 1. However, as illustrated in FIG. 15, an inspection apparatus 1' without the user interface unit 38 and a server 4 provided with the user interface unit 38 may be connected through the network 5 to construct an inspection system 7. In this case, a known server apparatus, such as a web server, can be used as the server 4.

In the above-described embodiments, the example in which the inspection apparatus 1 is connected to the industrial machine 2 and uses the data acquired from the industrial machine 2 has been described. However, the use of the inspection apparatus 1, the inspection system 7, and the user interface according to the present disclosure is not limited thereto. For example, the past data obtained from the industrial machine 2 may be stored in a cloud server and the above-mentioned analysis process may be performed using the stored data. In addition, the target data in the present disclosure is not particularly limited to the data acquired from the industrial machine 2. The data can be appropriately used for the data groups used for learning and inference in machine learning.

In the above-described embodiments, the example in which the sample groups divided into each group by the inspection apparatus 1 are used for learning and inference (verification) in machine learning has been described. However, the sample groups may be used for various purposes. For example, the sample group is divided into three groups A, B, and C and hyper-parameters at the time of learning using the group A are determined on the basis of the result of evaluating the model, which has been generated by learning using the group A, using the group B. Then, after the hyper-parameters are determined, the model generated by learning using the group A is evaluated using the group C.

In the above-described embodiments, the example in which the result of learning/inference by the machine learning device 100 is output to the user interface unit 38 has been described. However, the result of learning/inference by the machine learning device 100 may be stored in, for example, a storage region provided in the non-volatile memory 14 included in the inspection apparatus 1 or may be output to a cloud server, a host computer, or another inspection apparatus through a network (not illustrated) so as to be used.

The invention claimed is:

1. A method for displaying, the method performed by a processing device, comprising:
   creating group data obtained by dividing a plurality of samples into a plurality of groups;
   performing a statistical process for the plurality of samples divided into each of the plurality of groups to calculate data indicating a statistical state of a predetermined data item in each of the plurality of groups; and
   based on the calculated data, displaying the statistical state in a display format enabling recognition of the statistical state in each of the plurality of groups,
   wherein said performing the statistical process includes creating further data indicating a number of samples related to the predetermined data item for each data value, and the method further comprises:
   creating further group data by adjusting the group data based on the displayed statistical state, the further group data including a learning data group and an evaluation data group,
   performing machine learning using the learning data group to generate a learning model,
   performing an evaluation of the learning model using the evaluation data group, and
   displaying, a result of the evaluation of the learning model.

2. The method according to claim 1, wherein
   the display format is a format displaying the data indicating the statistical state of the predetermined data item in a list format enabling a sorting operation or a filtering operation for the plurality of samples.

3. The method according to claim 1, wherein
   the display format is a format displaying the data indicating the statistical state of the predetermined data item in a graph format.

4. The method according to claim 1, wherein
   the display format is a format displaying the data of same format in the plurality of groups so as to be arranged side by side a vertical direction or a horizontal direction or so as to be superimposed on each other.

5. The method according to claim 4, further comprising:
   synchronizing a display operation for the data of the same format.

6. The method according to claim 1, further comprising:
   adjusting a group of the plurality of groups as a division destination of the plurality of samples,
   receiving a change operation of changing the division destination, and
   adjusting the group as the division destination of the plurality of samples to be subjected to the change operation in response to the change operation.

7. The method according to claim 6, further comprising:
   performing display such that a change in the statistical state of the predetermined data item after adjusting the group as the division destination of the plurality of samples is recognizable in advance.

8. The method according to claim 1, further comprising:
   adjusting a group of the plurality of groups as a division destination of the plurality of samples,
   receiving an operation of selecting one or more input sample groups and an operation of selecting a plurality of output groups as division destinations, and dividing automatically the selected one or more input sample groups into the plurality of output groups.

9. The method according to claim 8, further comprising:
receiving an operation of designating one or more predetermined data items having priority when dividing samples included in an input sample group of the selected one or more input sample groups, and
dividing automatically the selected one or more input sample groups into the plurality of output groups in consideration of the designated one or more predetermined data items having priority.

10. A user interface unit configured to perform a display using the method of claim 1.

11. A display device configured to perform a display using the method of claim 1.

12. An inspection apparatus, comprising:
a processor configured to
create group data obtained by dividing a plurality of samples into a plurality of groups;
perform a statistical process for the plurality of samples divided into each of the plurality of groups to calculate data indicating a statistical state of a predetermined data item in each of the plurality of groups; and
based on the calculated data, cause a display to display the statistical state in a display format enabling recognition of the statistical state in each of the plurality of groups, wherein
said performing the statistical process includes creating further data indicating a number of samples related to the predetermined data item for each data value, and
the processor is further configured to
create further group data by adjusting the group data based on the displayed statistical state, the further group data including a learning data group and an evaluation data group,
perform machine learning using the learning data group to generate a learning model,
perform an evaluation of the learning model using the evaluation data group, and
cause the display to display a result of the evaluation of the learning model.

13. The method according to claim 1, wherein
said performing the statistical process further includes creating, for said each data value of the predetermined data item, another data indicating a proportion of the plurality of samples having a data value to a total number of the plurality of samples.

14. The method according to claim 1, wherein
said performing the statistical process further includes calculating
a first number of images with a flaw or without the flaw in the plurality of samples of each of the plurality of groups,
a second number of the images for each flaw type in the plurality of samples of each of the plurality of groups, and
a third number of images with the flaw for each image identification number in the plurality of samples of each of the plurality of groups.

15. The method according to claim 1, wherein
the predetermined data item indicates features of image data including whether a flaw is present or absent, a flaw type, and an image identification number.

16. The method according to claim 15, wherein
the predetermined data item indicating whether the flaw is present or absent has a data value indicating present or absent.

17. The method according to claim 15, wherein
the predetermined data item indicating the flaw type has a data value indicating cut, scratch, dirt, and rust.

18. The method according to claim 15, wherein
the predetermined data item indicating the image identification number has a data value indicating figures in the image identification number.

* * * * *